United States Patent
Sullivan et al.

(10) Patent No.: US 8,245,910 B2
(45) Date of Patent: Aug. 21, 2012

(54) STORED-VALUE CARD MANAGEMENT METHOD AND SYSTEM

(75) Inventors: Thomas J. Sullivan, Poland, OH (US); J. Simmons Graves, Pittsburgh, PA (US)

(73) Assignee: Corporate Business Systems, Inc., Monaca, PA (US)

(*) Notice: Subject to any disclaimer, the term of this patent is extended or adjusted under 35 U.S.C. 154(b) by 369 days.

(21) Appl. No.: 12/284,194

(22) Filed: Sep. 19, 2008

(65) Prior Publication Data
US 2009/0078755 A1   Mar. 26, 2009

Related U.S. Application Data

(60) Provisional application No. 60/994,509, filed on Sep. 20, 2007.

(51) Int. Cl.
*G07F 19/00* (2006.01)

(52) U.S. Cl. ........................................ 235/379

(58) Field of Classification Search ............... 705/14
See application file for complete search history.

(56) References Cited

U.S. PATENT DOCUMENTS

| | | | |
|---|---|---|---|
| 6,000,608 | A | 12/1999 | Dorf |
| 6,612,487 | B2 | 9/2003 | Tidball et al. |
| 6,886,742 | B2 * | 5/2005 | Stoutenburg et al. ......... 235/379 |
| 7,054,842 | B2 * | 5/2006 | James et al. .................. 705/64 |
| 7,083,084 | B2 | 8/2006 | Graves et al. |
| 2002/0062249 | A1 * | 5/2002 | Iannacci ....................... 705/14 |
| 2002/0091578 | A1 | 7/2002 | Thomas |
| 2004/0139318 | A1 | 7/2004 | Fiala et al. |
| 2005/0027655 | A1 | 2/2005 | Sharma et al. |
| 2005/0051619 | A1 | 3/2005 | Graves et al. |
| 2005/0108121 | A1 | 5/2005 | Gravett et al. |
| 2006/0224454 | A1 * | 10/2006 | Kantor et al. ................ 705/14 |

* cited by examiner

*Primary Examiner* — Thien M. Le
*Assistant Examiner* — Christle Marshall
(74) *Attorney, Agent, or Firm* — Carothers & Carothers

(57) ABSTRACT

A computerized system for activating, issuing and otherwise managing transactions and activities pertaining to stored-value cards over a communications network. A central information database is provided for storing stored-value cardholder and card purchaser information received directly from respective stored-value cardholders and card purchasers PCs through a universal central processor via respective communication gateways. The central processor is coupled for communication realtime to multiple unaffiliated stored-value card processing networks normally operated by respective hosts. Each network includes a stored-value card processor coupled to a stored-value card database and multiple respective merchant communication devices. The central processor is programmed for managing the activation and issuance of transactions and activities for the stored-value card through the respective unaffiliated networks. The universal central processor is programmed to issue the stored-value cards directly to the cardholder or card purchaser by download over respective communication gateways. The universal central processor is further programmed for reporting the card activations, issuances, transactions and activities to the cardholders and the merchants thereby providing a universal management system.

17 Claims, 2 Drawing Sheets

STORED-VALUE CARD MANAGEMENT METHOD AND SYSTEM

CROSS-REFERENCE TO RELATED PATENT APPLICATIONS

This patent application claims the benefit of U.S. Provisional Patent Application No. 60/994,509, filed Sep. 20, 2007, for STORED-VALUE CARD MANAGEMENT SYSTEM, the contents of which are incorporated herein by reference.

BACKGROUND OF THE INVENTION

The present invention relates generally to stored-value cards used for purchasing goods and services, and more particularly to a computerized method and system for activating, issuing and otherwise managing transactions and activities pertaining to stored-value cards over a communications network.

Examples of stored-value cards are prepaid cards, gift cards, rewards cards and the like. Each stored-value card transaction and activity is managed through its respective card processing network. Each such network typically includes a stored-value card processor coupled to a stored-value card database and to multiple respective merchant communication interface devices, such as point-of-sale (POS) terminals or communication gateways, such as an Internet gateway. These respective stored-value card processing networks are unaffiliated and they are operated through different stored-value card processor systems operated by different respective hosts, such as Chase Paymentech™, RBS WorldPay™, Radiant/Aloa™, Future POS™, or any of a number of other stored-value card processor hosts.

There exists a large number of patent applications and patents pertaining to how these respective stored-value card processing networks should process activities and transactions. An example of one such network is disclosed in U.S. Pat. No. 7,083,084.

SUMMARY OF THE INVENTION

It is a principal object of the present invention to provide a universal method and system for managing these multiple unaffiliated stored-value card processing networks.

The present invention provides a method and apparatus for managing stored-value cards, such as gift, prepaid and rewards card activity for multiple locations or unaffiliated group entities or networks. Most of these transactions and activities are accomplished through realtime data communications with these different unaffiliated stored-value card processors through a universal central processor, which enables unlike make and model credit card terminals and point-of-sale systems to be consolidated into a universal reporting system for stored-value cardholder transactions and activities.

The method and system of the present invention activates, issues and otherwise manages transactions and activities pertaining to multiple or many unaffiliated stored-value card processing networks. As previously explained, each such existing stored-value card processing network generally includes a stored-value card processor connected to a stored-value card database and multiple respective merchant communication interface devices, such as POS terminals, computers or other communication gateways, for communication by the respective merchants with the processors.

The present invention provides universal management of these unaffiliated systems by providing a universal central processor that communicates with a universal stored-value card cardholder information database which is managed by this universal central processor. This universal central processor also communicates with potential or existing stored-value cardholders or holder benefactors (card purchasers), and further communicates in realtime (with the exception of reporting transactions and activities in some instances) with the multiple respective unaffiliated stored-value processing networks. Accordingly, all activation and issuance of and selected transactions and activities for the stored-value cards are managed by the universal central processor through the unaffiliated networks. The system of the present invention utilizes processing and data collection capabilities already existing in the stored-value processing infrastructure. It does not utilize or rely on a processing hub.

The universal central processor is programmed for activating and issuing stored-value cards through the unaffiliated stored-value card processors, which are owned by different hosts, directly to the cardholders or holder benefactors PC via a communication gateway. Upon activation of a stored-value card through the universal central processor, the universal central processor issues an authorization number for each respective card and issues the stored-value card directly to the cardholder or card purchaser through a communication gateway or an Internet gateway, the card being downloaded and printed by the cardholder or card purchaser on a PC. The universal central processor is further programmed for managing stored-value card transactions and activities through the different unaffiliated stored-value card processors and then reports the activations, transactions and activities to the respective merchants and cardholders. Thus a universal system is provided for management of stored-value card activation, issuance and management of transactions and activities for unaffiliated host networks, all over a communications network.

The method and system of the present invention permits immediate electronic sale and issuance of a stored-value card based authorization number from a central universal processing system, the redemption of which is done through credit card terminals, point-of-sale systems or gateways which are used for secure control of funds availability.

Thus, no matter what unaffiliated stored-value card is being issued, the issuance thereof can be universally accomplished over a communication gateway connection by the universal central processor directly to the cardholder or the card purchaser. The universal central processor links all stored-value card transactions and activities accomplished through one of the unaffiliated networks directly to an individual cardholder identified in the central cardholder information database and all such card activations, issuances, transactions and activities are reported by the universal central processor to the cardholders and the merchants.

BRIEF DESCRIPTION OF THE DRAWINGS

Other objects and advantages appear hereinafter in the following description and claims. The accompanying drawings show, for the purpose of exemplification, without limiting the scope of the present invention or the appended claims, certain practical embodiments of the present invention wherein:

DETAILED DESCRIPTION OF THE PREFERRED EMBODIMENTS

Figure 1:
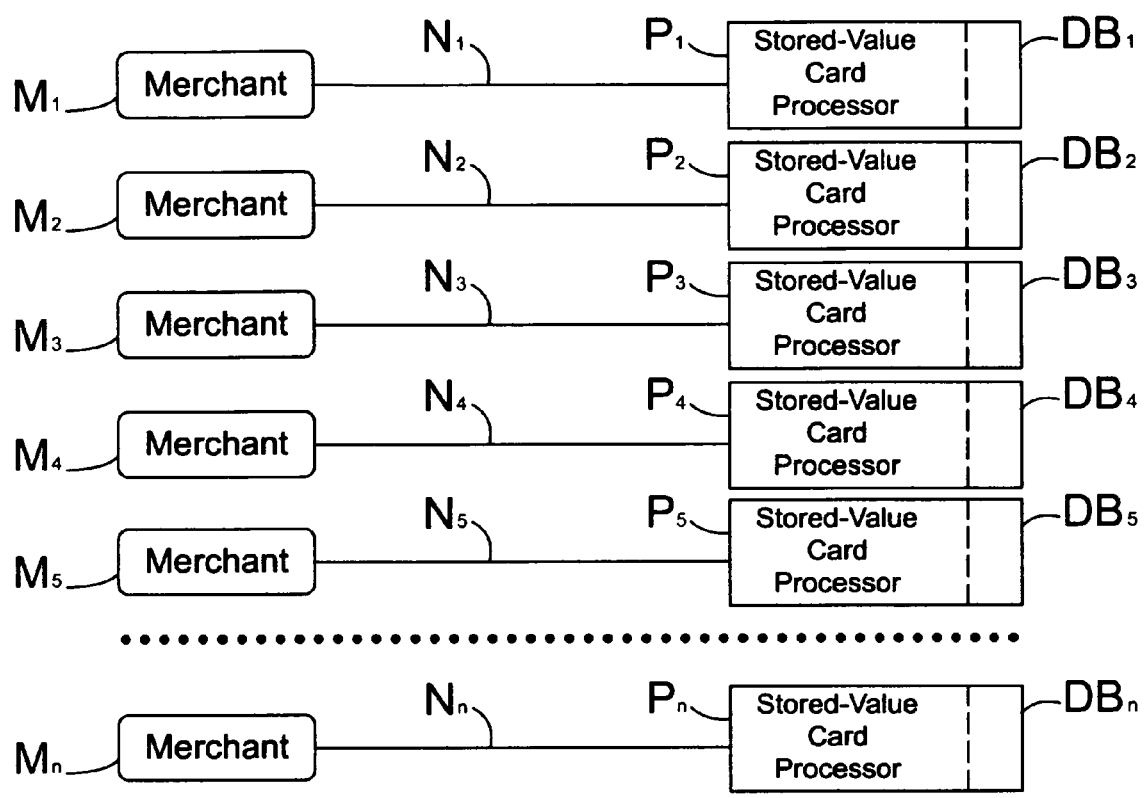
FIG. 1 is a schematic block diagram illustrating how existing unaffiliated stored-value card processing networks function or operate.

Multiple unaffiliated stored-value card processing networks are utilized as illustrated in FIG. 1 for the management of stored-value card transactions and activities for respective different stored-value card hosts. These separate and unaffiliated networks N1 through Nn are independently operated and managed by respective host stored-value card processors P1 through Pn, each stored-value card processors P1 through Pn being connected to a respective stored-value card database DB1 through DBn. The respective merchants communicate through communication interface devices M1 through Mn with the respective processors P1 through Pn for respectively handling stored-value card transactions and activities.

The merchant communication interface devices M1 through Mn might consist typically of, for example, a point-of-sale (POS) system or terminal or a more sophisticated communication system, such as a communication gateway, via PCs and handheld computers. A significant number of patents and patent applications exist regarding to how these networks N1 through Nn process the card activities and transactions and each respective network N1 through Nn is independently operated by a different unaffiliated host. For example, processors P1 through Pn are operated and maintained by different hosts, such as Future POS™, Radiant/Aloha™, Chase Paymentech™ and RBS WorldPay™.

The respective stored-value cards are normally issued to the cardholder by the respective merchant. Typical stored-value cards are gift cards, rewards cards, rebate cards, and other prepaid cards, such as for gasoline, telephone use etc.

These independent unaffiliated networks N1 through Nn, being independently operated, actually results in limited capability for all parties concerned, including the cardholder, the card benefactor or purchaser, the merchant and the host bank.

The stored-value card management system of the present invention provides universal management of gift, prepaid, and rewards card activity for all of these multiple location or unaffiliated group entities or networks N1 through Nn. Under the method and system of the present invention, realtime data communications of a universal central processor with the stored-value card networks N1 through Nn, unlike make and model credit card terminals and point-of-sale systems, provides consolidation into a universal reporting system of cardholder activity. The system also permits immediate electronic sale and issuance of a stored-value card-based authorization number and a corresponding card from a universal central processing system. The redemption of the cards is done through a credit card terminal, point-of-sale system, or other devices, such as a telephone or computer, capable of serving as a communication interface with the universal central processing system, or a gateway to the central processing system.

The method and system of the present invention thus permits the gift card or other stored-value cards, to be downloaded on a PC by the purchaser with immediate electronic sale and issuance of a stored-value card authorization number from a central universal processing system. The redemption of the issued cards is done through a credit card terminal, a point-of-sale system or gateway which is used for secure control of funds availability.

Figure 2:
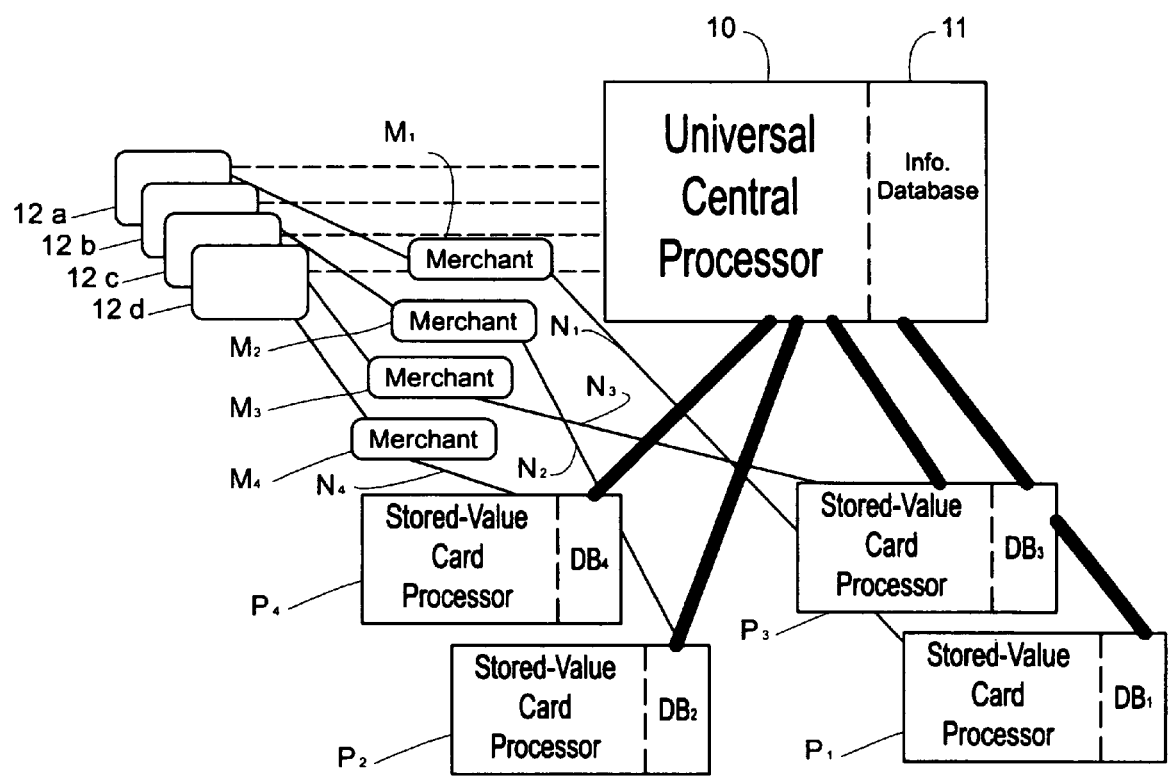
FIG. 2 is a schematic block diagram illustrating the computerized method and system of the present invention for universally managing the multiple unaffiliated stored-value card processing networks illustrated in FIG. 1.

Referring to FIG. 2, a universal central processor 10 is provided which overlooks and oversees the management of the many different unaffiliated networks N1 through Nn. Networks N1 through N4 only are illustrated for the sake of clarity and simplicity. The universal central processor 10 is connected to or communicates realtime with a universal stored-value cardholder information database 11 managed by the universal central processor 10. The universal central processor 10 in turn communicates realtime (except for some activity reporting purposes) with potential or existing stored-value cardholders or holder benefactors or purchasers via the communication or Internet gateways (PCs) 12a through 12d.

Universal central processor 10 is programmed for activating and issuing stored-value cards through the unaffiliated stored-value card processors P1 through P4 directly to the 12a cardholders or cardholder benefactors or purchasers via the communication gateways 12a through 12d. Universal central processor 10 is further programmed for managing the stored-value card transactions and activities through the stored-value card processors P1 through P4 and for reporting the activations, transactions and activities to respective merchants and cardholders through gateways M1 through M4 and 12a through 12d. Accordingly, the universal central processor associates all such transactions and activities directly with an individual cardholder identified in the information database 11. Such transactions include transactions, such as purchases, rewards, redemptions and placement of funds, and such activities include information for the cardholder and the merchant pertaining to balances and placement of funds, which activities are not always reported realtime.

The potential cardholder or card purchaser can log into the universal central processor 10 via a communication gateway 12a through 12d and register their card by entering some personal information, such as name, telephone number, address, e-mail address etc. Once registered in the information database 11 of the universal central processor 10, with payment being made and accepted through a credit card, an identification number is issued by the universal central processor 10 and the cardholder or cardholder benefactor can download the stored-value card on his or her respective gateway communication device 12a through 12d. Once the card has been issued, the cardholder may request a card balance, add funds to the stored-value card via a credit card or request other related information from the universal central processor, and the respective merchants and host processors are notified by the universal central processor 10 of the activation and issuance of the card via their respective communication gateways M1 through M4 and processors P1 through P4. The merchants through their respective communication gateways M1 through M4 can interact with the respective stored-value processors P1 through P4 through the universal central processor 10. The merchant can also add bonus funds to a card for purchases made.

Accordingly, the system of the present invention can produce a merchant-specific gift card on the Internet that can be printed by the customer or e-mailed to the gift recipient. Because the card is, in a sense, created by the purchaser, any amount can be placed on the card. In addition, the purchaser can choose a holiday occasion for the gift card and can add a personal message that is incorporated on or in the card.

Security for the issued card resides in the fact that it is a stored-value card and only the funds or partial funds left on the card can be redeemed. The recipient's name and Card Verification Valued number may also be placed on the card for future merchant security.

In addition, the system of the present invention can be employed in a wide variety of marketing programs. Newsletters, new product announcements, and seasonal specials can all be sent to customers through a mass e-mail system operated by the universal central processor 10. Other customer alerts, such as the creation of gift card rewards can also travel to the customer via this e-mail system. The system also may be provided with built-in tracking functions to help in marketing analysis.

The system and method of the present invention permit increase in profit for the merchant by providing a 24 hour a day, 7 day a week sales location over the Internet. Extreme conveniences are provided by being able to obtain a gift card or other stored-value card by immediate download which is ready for immediate use.

We claim:

1. A computerized method for activating and issuing stored-value cards over a communications network directly to the cardholder on behalf of a merchant, the method comprising:

storing in a central information database stored-value cardholder and card purchaser information and card purchasing requests received directly from respective stored-value cardholders and card purchasers through a central processor via respective communication gateways;

coupling said central processor for data communications to multiple unaffiliated stored-value card processing networks, each network including a stored-value card processor coupled to a stored-value card database, and multiple respective merchant communication devices; and in response to a card purchaser request, immediately electronically activating and issuing a stored value card from the central processor to the cardholder over the Internet and managing the interface transactions and activities originated by a cardholder for the stored-value cards through said unaffiliated networks by said central processor.

2. The computerized method of claim 1, wherein the issuing of the stored-value cards is accomplished over a communication gateway connection by said central processor directly to said cardholder or card purchaser.

3. The computerized method of claim 1, wherein each stored-value card transaction and activity accomplished through one of said networks is directly associated by said central processor with an individual cardholder identified in said central information database.

4. The computerized method of claim 1, reporting the card activations, issuances, transactions and activities by said central processor to the cardholders and the merchants.

5. The computerized method of claim 1, wherein activation includes issuance of an authorization number by said central processor.

6. A method of universally managing multiple unaffiliated stored-value card processing networks, each network including a stored-value card processor connected to a stored-value card database, and multiple respective merchant communication interface devices for communication by respective merchants with said processors, said method comprising:

providing a universal central processor and communicating said processor with a universal stored-value card cardholder information database managed by said universal central processor, communicating said universal central processor with potential or existing stored-value cardholders or holder benefactors through communication gateways, and communicating said universal central processor with said stored-value processing networks; and programming said universal central processor for electronically activating and issuing stored-value cards through said unaffiliated stored-value card processors directly to said cardholders from the central processor over the Internet or holder benefactors via said communication gateways, and further programming said universal central processor for managing stored-value card transactions and activities through said stored-value card processors and reporting said activations, transactions and activities to respective merchants.

7. The method of claim 6, programming said central processor for associating each of said transactions and activities directly with an individual cardholder identified in said information database.

8. A computerized system for activating and issuing stored-value cards over a communications network directly to the cardholder on behalf of a merchant, the system comprising:

a central information database for storing stored-value cardholder and card purchaser information and card purchasing requests received directly from respective stored-value card holders and card purchasers through a central processor via respective communication gateways;

said central processor coupled for communication to multiple unaffiliated stored-value card processing networks, each network including a stored-value card processor coupled to a stored value card database, and multiple respective merchant communication devices;

said central processor programmed in response to a card purchaser request for immediately electronically activating and issuing a stored-value card from the central processor over the Internet and managing the transactions and activities originated by a cardholder for the stored-value cards through said unaffiliated networks.

9. The computerized system of claim 8, wherein said central processor is programmed to issue said stored-value cards directly to said cardholder or card purchaser over said communication gateways.

10. The computerized system of claim 8, wherein said central processor is programmed to directly associate each stored-value card transaction accomplished through one of said networks with an individual cardholder identified in said central information database.

11. The computerized system of claim 8, wherein said central processor is programmed for reporting the card activations, issuances, transactions and activities to the cardholders and the merchants.

12. The computerized system of claim 8, wherein said central processor is programmed to issue an authorization number when activating a stored-value card.

13. A system for universal management of multiple unaffiliated stored-value card processing networks, each network including a stored-value card processor connected to a stored-value card database, and multiple respective merchant communication interface devices for communication by respective merchants with said processors, said universal management system comprising:

a universal central processor communicating with a universal value-card cardholder information database managed by said universal central processor, with potential or existing stored-value cardholders or holder benefactors, and with said stored-value card processing networks;

said universal central processor programmed for electronically activating and issuing stored-value cards from the central processor over the Internet through said unaffiliated stored-value card processors directly to said cardholders or holder benefactors via communication gateways, and managing the stored-value card transactions and activities through said stored-value card processors with universal reporting to respective merchants.

14. The system of claim 13, wherein said universal central processor is further programmed to link each of said transactions and activities with a cardholder in said universal value-card cardholder information.

15. The system of claim 13, said stored-value cards including gift cards, prepaid cards and reward cards.

16. The system of claim 13, wherein said merchant communication interface devices include a point-of-sale (POS) terminal or a communication gateway.

17. The system of claim 16, wherein card activation and merchant card transactions are communicated via said merchant communication interface devices.

* * * * *